United States Patent [19]

Saitoh et al.

[11] Patent Number: 4,558,327

[45] Date of Patent: Dec. 10, 1985

[54] MAGNETIC COPYING METHOD AND APPARATUS

[75] Inventors: Koichi Saitoh; Kiyoshi Horie; Teruhiko Itami; Toshifumu Kimoto, all of Kanagawa, Japan

[73] Assignee: Fuji Xerox Co., Ltd., Tokyo, Japan

[21] Appl. No.: 553,917

[22] Filed: Nov. 21, 1983

[30] Foreign Application Priority Data

Nov. 19, 1982 [JP] Japan ................................ 57-201865

[51] Int. Cl.⁴ ................................ G01D 15/34

[52] U.S. Cl. ................................ 346/74.2; 346/74.4; 346/1.1

[58] Field of Search ................................ 346/74.2, 74.4, 1.1; 360/59; 428/39

[56] References Cited

U.S. PATENT DOCUMENTS 3,987,491 10/1976 Nelson ................................ 346/74.2
4,403,226 9/1983 Gaudioso ................................ 346/74.4
4,480,258 10/1984 Nishimura et al. ................................ 346/74.4

*Primary Examiner*—E. A. Goldberg
*Assistant Examiner*—A. Evans
*Attorney, Agent, or Firm*—Sughrue, Mion, Zinn, Macpeak & Seas

[57] ABSTRACT

A magnetic copying method and apparatus reads data from originals and records them in a ferromagnetic, image memory bearer. The master latent images formed on the image memory bearer are transferred from the memory bearer onto a ferromagnetic recording body as slave magnetic latent images, and, subsequently, these slave magnetic latent images are developed with toner into toner images so that they can be transferred onto transferring materials. Subsequently, the toner images on the transferring materials are fixed. The image memory bearer can be rewound after all the data contained in it have been transferred onto the transferring material so that additional copies can easily be made.

22 Claims, 10 Drawing Figures

MAGNETIC COPYING METHOD AND APPARATUS

BACKGROUND OF THE INVENTION

1. Field of the Invention

The present invention relates to a magnetic copying method and apparatus and, more particularly, to a novel magnetic copying method and apparatus in which a number of copies of many originals are easily obtained.

2. Description of the Prior Art

In order to obtain plural copies of numerous pages of originals, a printing system, such as an offset printing system and a high-speed electrographic system, are employed.

In the offset printing system, printing plates are formed individually for each page of a set of originals, and these plates are used to provide the respective prints. Accordingly, this system is disadvantageous because it takes a relatively long time to form printing plates, i.e., it is difficult to accomplish a printing operation quickly. In addition, one copy of a set of originals is obtained after all of the originals have been printed. Therefore, the system is not suitable for cases in which it is required to obtain the copy of the original quickly.

In the electrographic system, copies of a set of originals (consisting of a plurality of pages) can be obtained one-by-one. However, in order to obtain a number of copies of the set of originals, it is necessary to expose each original repeatedly to light and to use an intricate original circulating device.

A method may be considered in which picture data to be printed are stored in an electrical memory means which comprises a semiconductor or magnetic substance, and the picture data, thus stored, can be read out for every page so that copies of the set of originals can be made set-by-set. However, in general, the picture data memory capacity is required to be large, and it is therefore required to use a combination of memories which are large in capacity and low in price. In order to meet this requirement, a magnetic tape is employed.

In the case in which a magnetic tape is used as the memory, since the picture data are time series signals which have been suitably compressed, it is necessary to use an intricate decoding device in order to convert the signals into pictures. Therefore, the use of the magnetic tape as the memory is disadvantageous in that the copying device using the picture memory is bulky and relatively expensive.

SUMMARY OF THE INVENTION

An object of the present invention is to provide a novel copying method and apparatus which can readily make copies of a set of originals (consisting of plural pages), one-by-one, unlike a conventional copying method and apparatus. This object is achieved by a magnetographic device which comprises a ferromagnetic recording body; a ferromagnetic, image memory bearer which contains master magnetic latent images; magnetic latent image transferring means for transferring the master latent images on the memory bearer onto the ferromagnetic recording body; means for developing the slave magnetic latent images transferred and formed on the ferromagnetic recording body; toner image transferring means for transferring the toner images on the recording body onto a transferring member; and means for fixing the toner images on the transferring member.

The present invention utilizes a magnetographic method in which a magnetic latent image is formed on a magnetizable, ferromagnetic body and developed with fine magnetic powder such as magnetic toner. The magnetic toner image is then transferred onto a sheet of paper or the like to form a copy.

The specific features of the present invention are that a set of originals, consisting of plural pages, are read by original reading means and data obtained therefrom are stored in a magnetic, image memory bearer as imagewise master magnetic latent images. The master latent images data for each page or for each set of pages are then transferred onto a magnetographic, ferromagnetic body and are subjected to developing and transferring in the magnetographic process, the transferring process and the magnetographic process for the subsequent page or set of pages are carried out, and, after a single or plural copies of the set of originals have been obtained, the copying operation is returned to the image data for the first page, and the process is repeated, thus making a required number of copies of the set of originals.

DESCRIPTION OF THE PREFERRED EMBODIMENTS

Figure 1:
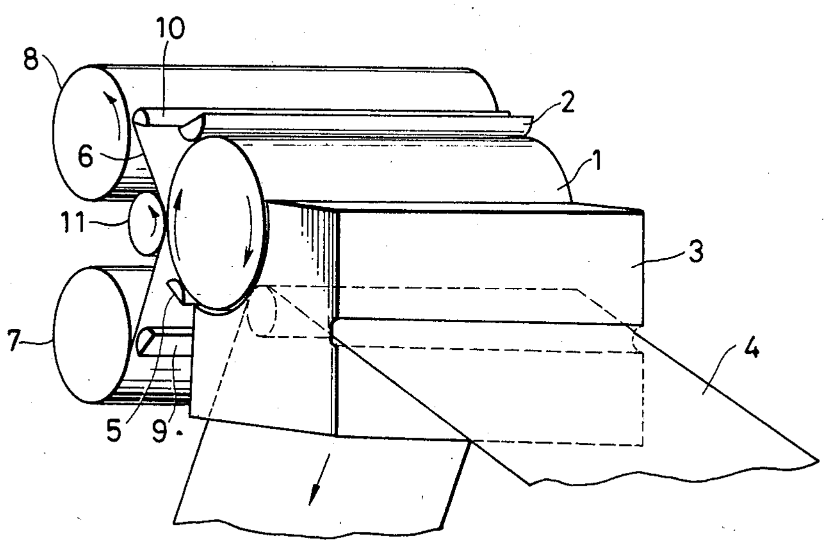
FIG. 1 is an explanatory diagram outlining one example of a magnetographic apparatus for implementing a magnetographic copying method according to the present invention.
Figure 2A:
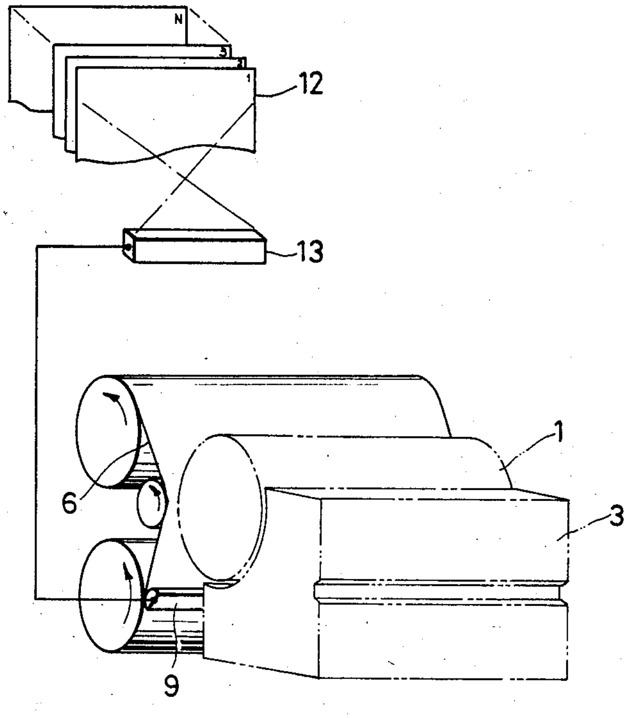
FIGS. 2(*a*) through 2(*d*) are explanatory diagrams illustrating a process of making copies of plural pages of originals.
Figure 2B:
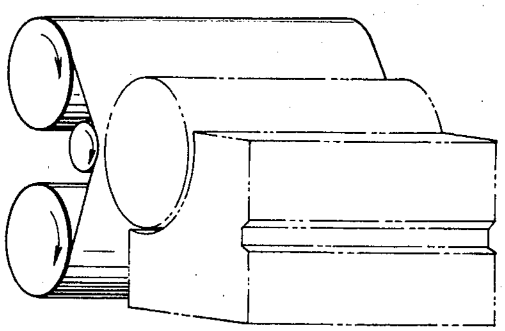
Figure 2C:
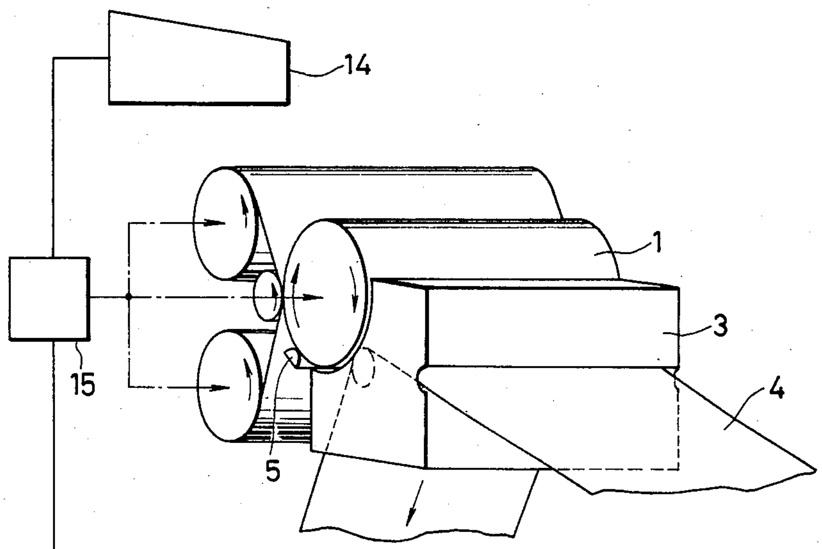
Figure 2D:
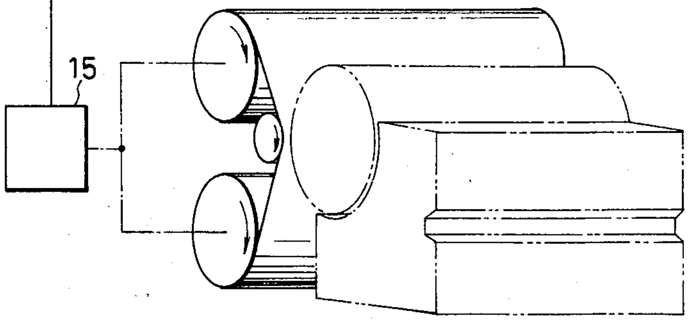

FIG. 1 is a diagram outlining the arrangement of one example of a magnetographic apparatus for implementing the method of the present invention. In FIG. 1, a magnetic latent image is formed on a ferromagnetic drum by means of a magnetic head 2. In the case in which the magnetic substance of the magnetic drum is a thermal magnetic material, a magnetic latent image may be formed by a heat inputting means, such as a thermal head array or a laser beam, or by a heat inputting means which operates in association with a suitable magnetic field-generating means. Reference numeral 3 designates a marking module which develops an image by using magnetic toner, transfers the toner image onto a running sheet 4, and removes residual magnetic toner. The magnetic latent image is erased by an erasing head 5 when a predetermined number of copies have been obtained.

An image file memory bearer 6 reciprocates between a supplying roll 7 and a take-up roll 8. Reference numeral 9 designates a writing magnetic head for the bearer 6, and reference numeral 10 designates an erasing magnetic head for the bearer 6. A bias magnetic field applying device 11 transfers image data (master latent image) which are stored in the image file memory bearer 6 onto the magnetic drum 1.

In an ordinary copying operation, the ferromagnetic drum 1 is set apart from the image file memory bearer 6 so that a magnetographic process is carried out in a conventional manner.

A process in which the above-described, image file memory 6 is used for copying a plurality of pages of originals, one after another, will be described with reference to FIGS. 2(*a*) through 2(*d*).

FIG. 2(*a*) is a diagram illustrating a process in which data on an original is read and written in the image file memory bearer 6 in the form of master latent image. In the case in which N pages of originals 12 are to be copied, data on each original are subjected to photoelectric detection by a photoelectric transduce element 13, such as a charge-coupled device (CCD) array, which results in an electrical signal being applied to the magnetic head 9 which is recorded in the image file memory bearer 6. This operation is successively carried out for the N pages of originals. In this operation, the ferromagnetic drum 1 for the magnetographic process and the marking module 3 are not operated; however, they could be separately operated if desired. In this case, the first page is copied while data are recorded in the file memory of the image file memory bearer 6. After image data for N pages have been recorded in the file memory, the drum 1 and the module 3 are placed in a non-operating state, and the file memory bearer 6 is rewound to the first page (see FIG. 2(*b*)).

Thereafter, as shown in FIG. 2(*c*), the master latent image for the first page is transferred onto the ferromagnetic drum 1 by the bias magnetic field applying device 11, and the transferred latent images are developed and the toner images are transferred onto the sheet 4 by the marking module 3. Subsequently, the transferred latent images are erased by the erasing head 5. Master latent images of successive pages continue to be transferred to the drum, developed, and further transferred onto the sheet 4 until N pages have been copied. When the image file memory bearer 6 has been fully unwound, it is then rewound, as shown in FIG. 2(*d*), so that the operation described with reference to FIG. 2(*c*) can be repeated. This operation is repeatedly carried out until a required number of copies (or m copies), which is inputted through a controlling device by a keyboard 14, has been produced.

In the above-described embodiment of the invention, the master latent images are transferred onto the ferromagnetic drum 1 for every page; however, if the drum has a surface area which is large enough to record the slave latent images for a set of pages at a time, the master latent images may be transferred onto the drum in plural, page set sequences. In addition, the slave latent image which has been transferred onto the drum 1 is erased after it has been developed and printed only once. However, if the magnetographic apparatus is combined with a sorter which is employed in an electrophotographic apparatus, and if the above-described operation is carried out plural times (for instance, m times), then m copies can be obtained per transfer of each master latent image for N pages (as shown in FIG. 2(*c*)).

As is apparent from the above description, the present invention provides a novel copying system when m copies of N pages of originals need to be made, and the copies can be successively obtained in such a manner that they are ready for bookbinding merely by reading the originals' data which have been recorded in the memory bearer 6.

Next, the transfer of a latent image onto the magnetographic substance on the drum 1 from the image file memory bearer 6 will be described.

As described above, the latent image is transferred when the magnetic substances from the memory bearer 6 and the drum 1 are brought into contact with each other, and no reading or writing is required. The transfer of the latent image (magnetic pattern), through contact between the memory bearer 6 and the drum 1, is achieved when a signal-like leakage magnetic field, which is generated by the image file memory magnetic substance, magnetizes the magnetographic magnetic substance on the drum 1. The magnetization can be effectively carried out by a method in which, when the magnetic substances are in contact with each other, a bias magnetic field is applied to them, or a method in which one of the magnetic substances is subject to bias heating.

In the method using the bias magnetic field, materials are selected so that the coercive force $Hc^S$ of the magnetographic magnetic substance on the drum 1, onto which the pictures are transferred, is smaller than the coercive force $Hc^M$ of the image file memory magnetic substance. With respect to the magnitude of the bias magnetic field, a method of applying an AC or DC magnetic field, the peak value of which is smaller than the coercive force $Hc^M$, is selected.

Figure 3A:
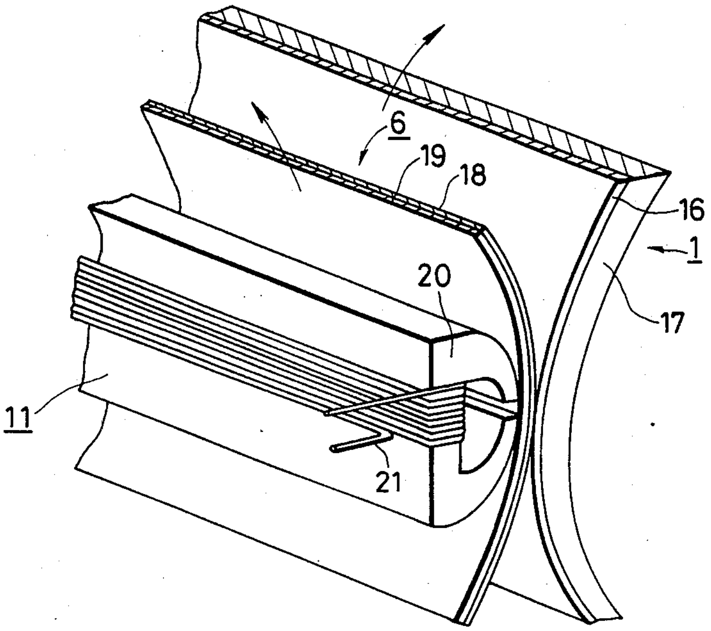
FIGS. 3(*a*) and 3(*b*) are explanatory diagrams showing a magnetic latent image transferring device utilizing a bias magnetic field.
Figure 3B:
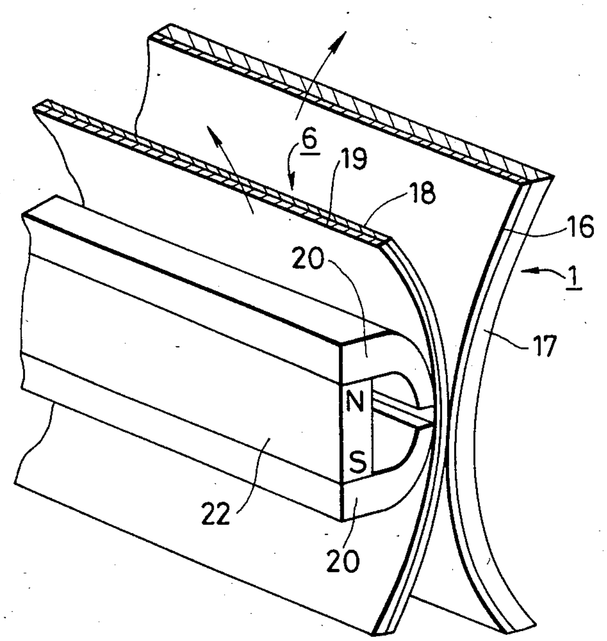

FIGS. 3(*a*) and 3(*b*) are explanatory diagrams illustrating methods of transferring a latent image by means of a bias magnetic field. In FIG. 3(*a*), an AC magnetic field is employed. Ferromagnetic substance layers 16 and 18 are formed on the ferromagnetic drum 1 and the image file memory bearer 6, respectively. The drum 1 and the bearer 6 are rotated at the same speed in the directions of the arrows, with the layers 16 and 18 maintained in contact with each other, and a bias magnetic field applying device 11 is arranged where the layers 16 and 18 are in contact. The device 11 is made up of an electromagnet which is formed by winding a wire 21 on a high permeability yoke 20. When alternating current is applied to the winding 21, a latent image transferring, bias AC magnetic field is applied from the gap of the high permeability yoke 20. As a result, the ferromagnetic drum is magnetized in an AC bias magnetization mode by the cooperation of the leakage magnetic field from signal magnetization which is recorded in the image file memory and the bias AC magnetic field, thus generating residual magnetization which has a mirror image relation with the signal magnetization recorded in the image file memory.

In FIG. 3(*b*), a DC magnetic field is utilized. The bias magnetic field applying device is a permanent magnet head with a high permeability yoke in order that the magnetic flux of a permanent magnet 22 is efficiently concentrated so that it can be applied to the ferromagnetic substances which are in close contact with each other. The ferromagnetic drum is magnetized in the DC bias magnetization mode in such a manner that its magnetization pattern is in a mirror image relation with that of the picture-like file memory.

When either an AC or DC bias magnetization mode is used, the coercive force $Hc^M$ of the image file memory bearer is selected to be larger than the coercive force $Hc^S$ of the magnetographic magnetic substance on the drum 1, and the peak value of the bias magnetic field is made smaller than the coercive force $Hc^M$ so that the magnetization pattern is maintained recorded on the image file memory bearer, even after transferring.

For instance, in the case in which a commercially available, $\gamma$-$Fe_2O_3$, resin dispersed, magnetic substance is used as the magnetographic magnetic substance, typically, its $Hc_S$ is about 400 Öe. Accordingly, it is preferably that the image file memory magnetic substance be a metal tape magnetic substance in which Fe-Co powder, which has a coercive force $Hc^M$ of about 800 Öe or more, is dispersed in resin, in a Co-Ni plated magnetic substance which has a coercive force $Hc^M$ of about 800 Öe or more, or in a vacuum-evaporated, metal magnetic substance which is vacuum-evaporated with $\gamma$-$Fe_2O_3$. In FIG. 3, the AC head or permanent magnetic head for magnetic field generation is provided on the side of the magnetic substance layer of the memory bearer 6; however, it may also be provided on the side of the magnetic substance layer of the magnetographic drum.

Figure 4A:
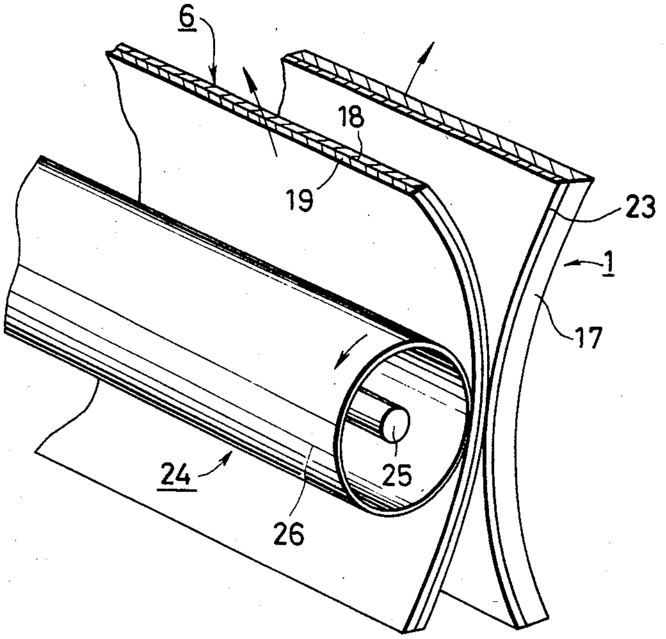
FIGS. 4(*a*) and 4(*b*) are explanatory diagrams showing a magnetic latent image transferring device utilizing a bias heating technique.
Figure 4B:
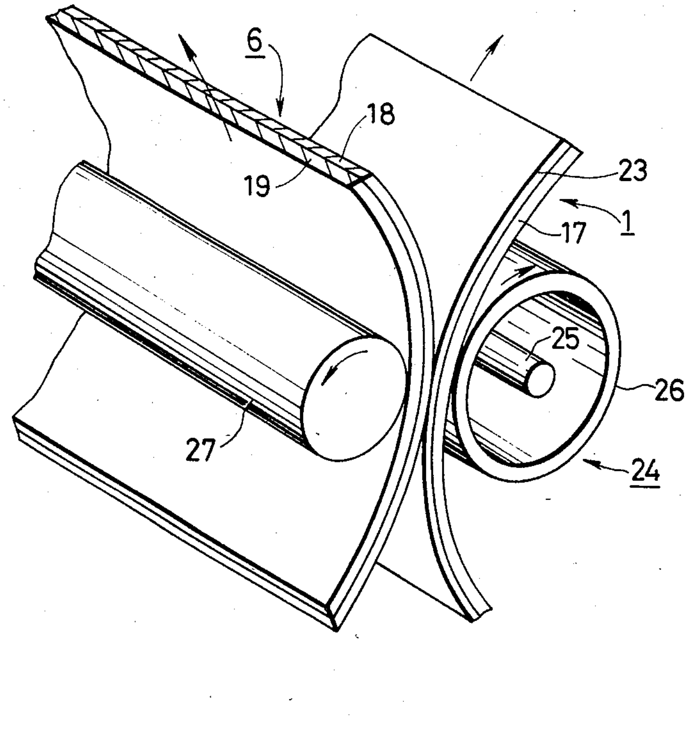

FIGS. 4(*a*) and 4(*b*) are diagrams outlining the arrangements of other examples of the latent image transferring device for practicing the method of the invention. In these devices, a bias heating technique is employed for transferring a master latent image onto the drum 1.

A magnetographic magnetic drum comprises a base layer 17 and a thermal magnetic layer which is formed on the base layer 17. The term "thermal magnetic layer", as used herein, is intended to mean a layer which is made of a ferromagnetic substance, the magnetic transformation temperature (such as its Curie temperature or magnetic compensation temperature) of which is a high temperature that is relatively close to room temperature. Such layers include a $CrO_2$ resin, layer dispersed tape, the Curie temperature of which is about 130° C., or a rare earth-transition metal, noncrystalline alloy magnetic substance layer such as Tb-Fe or Gd-Fe, the magnetic compensation temperature of which is about 70° C.

The latent image transferring process will now be described. In the above-described apparatus, a master latent image is transferred by subjecting the drum 1 and the bearer 6 to bias heating while they are in close contact with each other.

In the case of FIG. 4(*a*), the heating means is provided on the side of the image file memory bearer, and, in the case of FIG. 4(*b*), the heating means is provided on the side of the magnetographic magnetic drum.

The bias heating means is a radiation heat source, namely, a heating lamp 25 which is extended along a central axis of a hollow cylinder 26. Thus, heating is effected through the hollow cylinder 26 by thermal conduction. In the case of FIG. 4(*b*), a back-up roll 27 is employed in order to positively bring the image file memory bearer and the magnetographic ferromagnetic drum into close contact with each other.

Transfer of the latent image is achieved when the ferromagnetic drum is magnetized by the leakage magnetic field from signal magnetization on the file memory bearer. In general, the leakage magnetic field is not strong enough to magnetize the ferromagnetic drum; however, as the thermal magnetic material of the ferromagnetic drum is heated to a temperature close to its magnetic transformation temperature by bias heating, its coercive force is decreased, and the drum can be magnetized by the small leakage magnetic field.

The magnetic material for the image file memory bearer 6 may be any material, the magnetic transformation temperature of which is higher than that of the thermal magnetic material used for the ferromagnetic drum 1.

According to the present invention, the image file memory is so designed that it has, in general, at least 100 latent image forming surfaces. After a number of copies have been obtained, the data that are stored in the memory may be erased so that the memory can be used again, or the data may be held and retained, as desired.

It is desirable that the contents and locations of data which are stored in the file memory may be readily retrieved, and, hence, this information is stored in the file memory as additional data. Also, it is preferable that this additional data not be erased when the power source for the apparatus is disconnected, and, accordingly, the additional data are generally recorded in a magnetic tape or the like. In the magnetic copying apparatus of the present invention, the additional data can be stored in the image file memory.

A variety of methods for storing such additional data in the file memory may be considered. By way of example, one of the methods will now be described with reference to FIG. 5.

Figure 5:
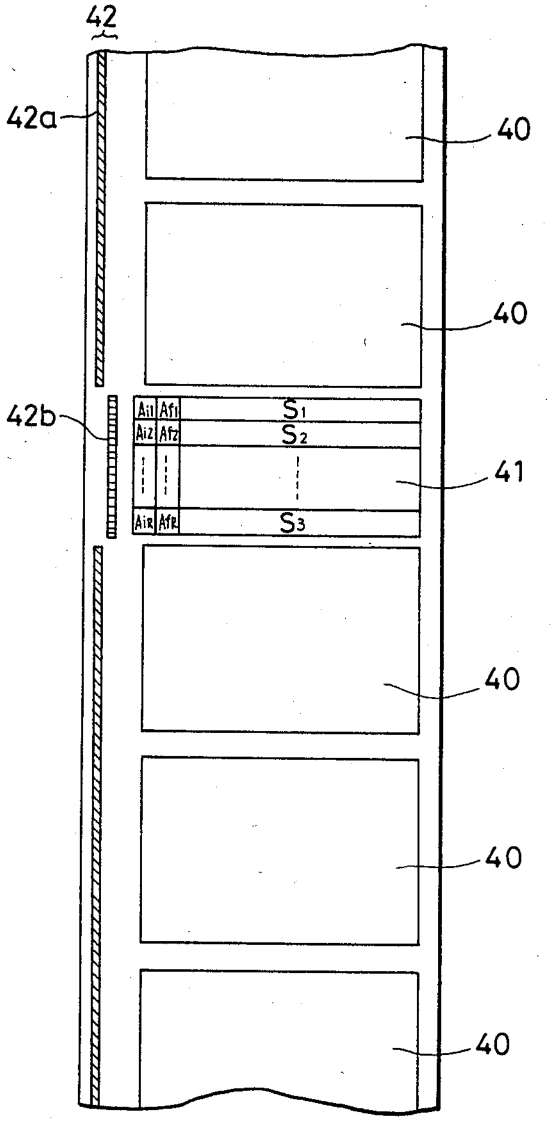
FIG. 5 is a diagram showing an example of additional data which are stored in a image file memory.

FIG. 5 is an enlarged view of the image file memory. The image magnetic latent images are formed in regions 40 while, at the same time, regions 41 for recording additional data are provided at suitable intervals.

A content-indicating track 42 is provided in the running direction of the image file memory in order to indicate the image data area 40 and the additional data area 41. In FIG. 5, the content-indicating track 42 consists of two tracks 42*a* and 42*b*. The track 42*a* indicates a image data area and is used to record the address of the image data. The track 42*b* indicates an additional data area and generates a block signal for writing or reading the electrically decoded, additional data in the additional data area.

The additional data area is divided into R parts which are arranged in the feeding direction of the file memory. In each of the parts, a content Sj is stored in addresses Aij through Afj ($1 \leqq j \leqq k$).

The additional data can be recorded and read by a magnetic head array in which the tracks are arranged longitudinally.

What is claimed is:

1. A magnetic copying method, comprising the steps of:

(a) forming master magnetic latent images from originals consisting of plural pages onto a magnetic image memory bearer;

(b) transferring at least one of said master latent images onto a magnetic recording means and forming a slave latent image corresponding to said at least one of said master latent images on said magnetic recording means;

(c) developing said slave latent image with toner;

(d) transferring said toner image onto a transfer sheet;

(e) fixing said toner image on said transfer sheet;

(f) erasing said slave latent image on said recording means;

(g) repeating said steps from (b) to (f) until the remaining master latent images have been copied to obtain a set of copies;

(h) repeating said steps from (b) to (g) until a number of required sets of copies have been obtained.

2. A magnetic copying method as claimed in claim 1, wherein the step (a) of said forming master magnetic latent images comprising the steps of a:

reading originals by means of photoelectric transducer element, which results in an electrical signal;

applying said electrical signal to a magnetic head;

and forming master magnetic latent images on said magnetic image memory bearer by said magnetic head.

3. A magnetic copying method as claimed in claim 2, wherein said photoelectric transducer element is a charge-coupled device.

4. A magnetic copying method as claimed in claim 1, wherein said transferring and forming said master latent image onto said magnetic recording means is carried out by a bias magnetic field applying device.

5. A magnetic copying method as claimed in claim 1, wherein said transferring and forming said master latent image onto said magnetic recording means is carried out by a bias heating device.

6. A magnetic copying method as claimed in claim 4, wherein said magnetic image memory bearer has a magnetographic magnetic layer thereon which has a coercive force larger than a coercive force of a magnetic layer formed on said magnetic recording means.

7. A magnetic copying method as claimed in claim 5, wherein said bias heating device includes a hollow cylinder, a heating lamp which extends along a central axis of said hollow cylinder, and a back-up roll, said hollow cylinder and said back-up roll being disposed on opposite sides of said magnetic recording means and said magnetic image memory bearer.

8. A magnetic copying method as claimed in claim 5, wherein said bias heating device includes a hollow cylinder and a heating lamp disposed along a central axis of said hollow cylinder, said hollow cylinder disposed at the rear of said magnetic image memory bearer in a vicinity where said magnetic image memory bearer and said magnetic recording means are in close contact.

9. A magnetic copying method as claimed in claim 1, wherein said magnetic image memory bearer includes regions for storing data from said originals and regions for storing additional data indicative of a location of said stored data of said originals.

10. A magnetic copying method as claimed in claim 1, wherein said magnetic image memory bearer is made of a metal tape of Fe-Co powder dispersed in resin.

11. A magnetic copying method as claimed in claim 1, wherein said magnetic image memory bearer is made of a Co-Ni plated magnetic substance.

12. magnetic copying method as claimed in claim 1, wherein said magnetic image memory bearer is made of a $\gamma$-$Fe_2O_3$ vacuum-evaporated magnetic substance.

13. A magnetic copying method as claimed in claim 1, wherein said magnetic recording means is made of a magnetic substance of $\gamma$-$Fe_2O_3$ powder dispersed in resin.

14. A magnetic copying method as claimed in claim 1, wherein said magnetic recording means is made of a magnetic substance of $CrO_2$ resin dispersed type.

15. A magnetic copying method as claimed in claim 1, wherein said magnetic recording means is made of a rare earth-transition metal, noncrystalline alloy magnetic substance.

16. A magnetic copying method as claimed in claim 4, wherein said magnetic image memory bearer is made of a metal tape of Fe-Co powder dispersed in resin.

17. A magnetic copying method as claimed in claim 4, wherein said magnetic image memory bearer is made of a Co-Ni plated magnetic substance.

18. A magnetic copying method as claimed in claim 4, wherein said magnetic image memory bearer is made of a $\gamma$-$Fe_2O_3$ vacuum-evaporated magnetic substance.

19. A magnetic copying method as claimed in claim 4, wherein said magnetic recording means is made of a magnetic substance of $\gamma$-$Fe_2O_3$ powder dispersed in resin.

20. A magnetic copying method as claimed in claim 5, wherein said magnetic recording means is made of a magnetic substance of $CrO_2$ resin dispersed type.

21. A magnetic copying method as claimed in claim 5, wherein said magnetic recording means is made of a rare earth-transition metal, noncrystalline alloy magnetic substance.

22. A magnetic copying method, comprising the steps of:

forming on a magnetic image bearer a plurality of master latent images of a corresponding plurality of originals;

transferring a first of said images from said image bearer to a magnetic recording means at a transfer station to form a first slave image on said magnetic recording means;

reproducing a copy of an original from said first slave image on a copying medium;

erasing said first slave image from said magnetic recording means;

advancing said bearer member past said transfer station and transferring a second image from said bearer member to said recording means to produce a second slave image on said recording means;

reproducing a copy of a second original from said second slave image on a copying medium;

erasing said second slave image from said recording means;

moving said bearer member past said transfer station in a reverse direction; and transferring said first of said images from said image bearer to said magnetic recording means at said transfer station to again from said first slave image on said recording means.

* * * * *